(12) United States Patent
Eisentraut et al.

(10) Patent No.: US 6,928,400 B2
(45) Date of Patent: Aug. 9, 2005

(54) METHOD FOR DESIGNING A DEPLOYMENT MECHANISM

(75) Inventors: Rudolph A. Eisentraut, Tucson, AZ (US); Edgar R. Melkers, Oxford, CT (US)

(73) Assignee: Raytheon Company, Waltham, MA (US)

( * ) Notice: Subject to any disclaimer, the term of this patent is extended or adjusted under 35 U.S.C. 154(b) by 847 days.

(21) Appl. No.: 09/969,453

(22) Filed: Oct. 2, 2001

(65) Prior Publication Data

US 2003/0062445 A1 Apr. 3, 2003

(51) Int. Cl.$^7$ .................. G06G 7/48; F42B 10/00; B64C 3/56
(52) U.S. Cl. .................. 703/7; 703/2; 703/8; 244/3.24; 244/49
(58) Field of Search ................. 703/1, 2, 7, 8; 244/3.24, 3.27, 3.28, 3.29, 46, 49, 165

(56) References Cited

U.S. PATENT DOCUMENTS

| | | | |
|---|---|---|---|
| 3,127,838 A | 4/1964 | Moratti et al. | 102/50 |
| 3,327,539 A | 6/1967 | Moskowitz et al. | 74/5.34 |
| 4,336,914 A | 6/1982 | Thomson | 244/46 |
| 4,664,339 A | 5/1987 | Crossfield | 244/3.28 |
| 5,108,051 A | 4/1992 | Montet et al. | 244/3.28 |
| 5,172,323 A | 12/1992 | Schmidt | 364/453 |
| 5,192,037 A | 3/1993 | Moorefield | 244/46 |
| 5,615,846 A | 4/1997 | Shmoldas et al. | 244/3.28 |
| 5,671,899 A | 9/1997 | Nicholas et al. | 244/49 |
| 5,829,715 A | 11/1998 | Banks | 244/49 |
| 5,996,941 A | 12/1999 | Sarauer et al. | 244/165 |
| 6,073,880 A * | 6/2000 | Voigt et al. | 244/3.28 |
| 6,092,264 A | 7/2000 | Banks | 16/321 |
| 6,152,041 A | 11/2000 | Harris et al. | 102/384 |
| 6,761,331 B2 * | 7/2004 | Eisentraut et al. | 244/3.28 |

FOREIGN PATENT DOCUMENTS

FR 2 663 731 6/1990 ........... F42B/10/60

OTHER PUBLICATIONS

Wells, L.L. The Projectile GRAM SAASM for ERGM and Excalibur, IEEE, Position Location and Navigation Symposium, Mar. 2000, pp. 106–111.*
Lyshevski, S.E. Nanotechnology for Smart Flight Control Surfaces, Proceedings of the 2002 2nd IEEE Conference on Nanotechnology, Aug. 2002, pp. 447–452.*
Ozimina et al., C.D. Flight Control System Design for a Small Unmanned Aircraft, Proceedings of the American Control Conference, IEEE, vol. 5, Jun. 1995, pp. 2964–2969.*
International Search Report (PCT/ISA/210).
D. Van Nostrand, *Leigh, Introduction to Theoretical Physics*; 3$^{rd}$ Edition, pp. 54–57.

* cited by examiner

Primary Examiner—Russell Frejd
(74) Attorney, Agent, or Firm—Renner, Otto, Boisselle & Sklar, LLP

(57) ABSTRACT

The present invention concerns a method for designing a deployment mechanism for a flight surface on an airborne body, including the steps of determining a stowed position of the flight surface, determining a deployed position of the flight surface, identifying a first rotation axis and respective rotation angle and a second rotation axis and respective rotation angle about and through which the flight surface is rotatable in sequence to move the flight surface from the stowed position to the deployed position, or vice versa, and using the identified first and second rotation axes and rotation angles to determine a single equivalent rotation axis and angle, about and through which the flight surface can be rotated from the stowed position to the deployed position, or vice versa.

3 Claims, 6 Drawing Sheets

METHOD FOR DESIGNING A DEPLOYMENT MECHANISM

FIELD OF THE INVENTION

The invention relates to a method for designing a deployment mechanism for a flight surface on a guided projectile, or a guided airborne body such as a bomb, dispenser, munition or missile.

BACKGROUND OF THE INVENTION

Guided airborne bodies such as munitions or missiles are routinely constructed with flight surface deployment systems to provide control and extended range capability. These systems include one or more control mechanisms for moving a foldable and/or retractable flight surface to move the flight surface from a stowed position to an active or deployed position.

Recently, because of volume constraints inside the airborne body, designs of airborne bodies have required the flight surface and/or control mechanism to be stored on, or partially on, the exterior of the airborne body. This has increased the complexity of deployment systems, in particular, those in which the flight surface is rotated, in sequence, about multiple axes to, for example, position the flight surface at a sweep angle or other obliquity relative to the airborne body axis. Such deployment systems include a complex arrangement of parts such as actuators and lock mechanisms to enable achievement of the desired active or deployed position of the flight surface.

To reduce the number of rotations and axes about which the surface is rotated and, consequently, the number of parts of the deployment system, attempts have been made to simulate the multiple axes rotations with a single equivalent axis and single rotation. Although satisfactory, such attempts have not been without difficulty. For example, according to at least one known method, numerous axes and angles are attempted on a trial and error basis until a suitable single axis and single rotation angle are obtained. Such a method is inefficient and tedious.

Thus, a need exists for an effective method for designing a deployment mechanism for a flight surface on an airborne body. Such a method preferably minimizes intrusive volume, the number of parts, and the complexity of the deployment mechanism. Moreover, such a method preferably simplifies the manner by which a single axis and single rotation angle may be obtained about and through which a flight surface is rotatable.

SUMMARY OF THE INVENTION

The present invention concerns a method for designing a deployment mechanism for a flight surface on an airborne body, including the steps of determining a stowed position of the flight surface, determining a deployed position of the flight surface, identifying a first rotation axis and respective rotation angle and a second rotation axis and respective rotation angle about and through which the flight surface is rotatable in sequence to move the flight surface from the stowed position to the deployed position, or vice versa, and using the identified first and second rotation axes and rotation angles to determine a single equivalent rotation axis and angle, about and through which the flight surface can be rotated from the stowed position to the deployed position, or vice versa.

In an embodiment, the using step determines the single equivalent rotation axis and angle in accordance with Euler's Rotation Theorem.

In an embodiment, the equivalent angle ($\epsilon_r$) is obtained from the equation:

$$\epsilon_r = 2\cos^{-1}\left[\cos\frac{\epsilon}{2}\cos\frac{\epsilon'}{2} - \sin\frac{\epsilon}{2}\sin\frac{\epsilon'}{2}\cos\theta\right]$$

and the equivalent rotation axis ($k_r$) is obtained from the equation:

$$k_r = k\frac{\sin\frac{\epsilon}{2}\cos\frac{\epsilon'}{2}}{\sin\frac{\epsilon_r}{2}} + k'\frac{\sin\frac{\epsilon'}{2}\cos\frac{\epsilon}{2}}{\sin\frac{\epsilon_r}{2}} + k'\times k\frac{\sin\frac{\epsilon}{2}\sin\frac{\epsilon'}{2}}{\sin\frac{\epsilon_r}{2}},$$

where $\epsilon$ is the first rotation angle, and $\epsilon'$ is the second rotation angle, and $\theta$ is the angle between the rotation axes k and k'.

The foregoing and other features of the invention are hereinafter more fully described and particularly pointed out in the claims, the following description and the annexed drawings setting forth in detail illustrative embodiments of the invention, such being indicative, however, of but a few of the various ways in which the principles of the invention may be employed.

DETAILED DESCRIPTION

Figure 1:
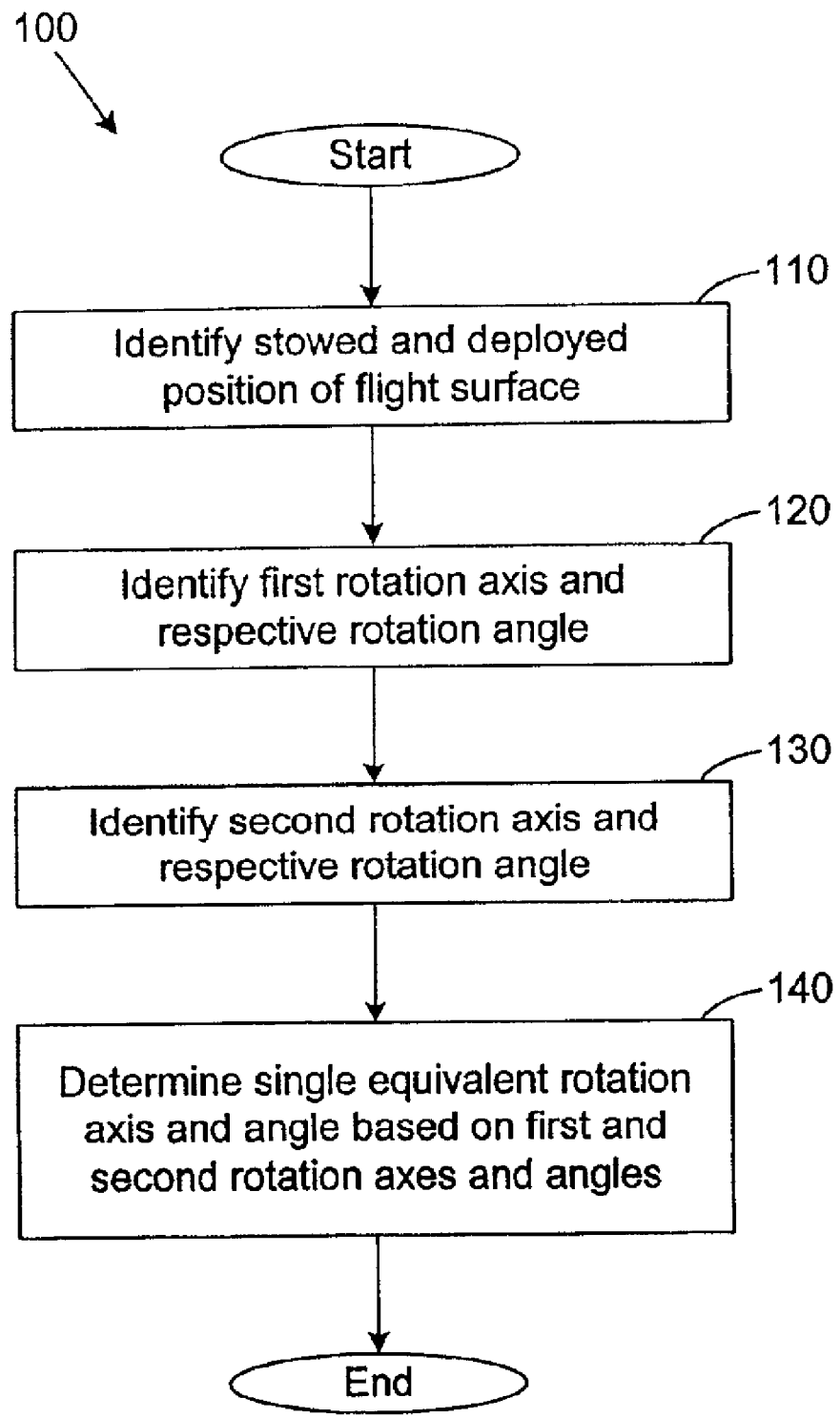
FIG. 1 is a flow chart of a method for designing a deployment mechanism for a flight surface in accordance with the present invention.
Figure 2:
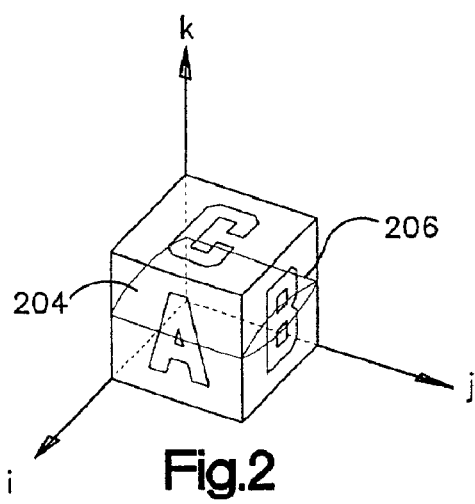
FIGS. 2–7 schematically illustrate an embodiment of first and second rotation axes and respective rotation angles about and through which the flight surface is rotatable in sequence to move the flight surface from a stowed position to a deployed position.
Figure 12:
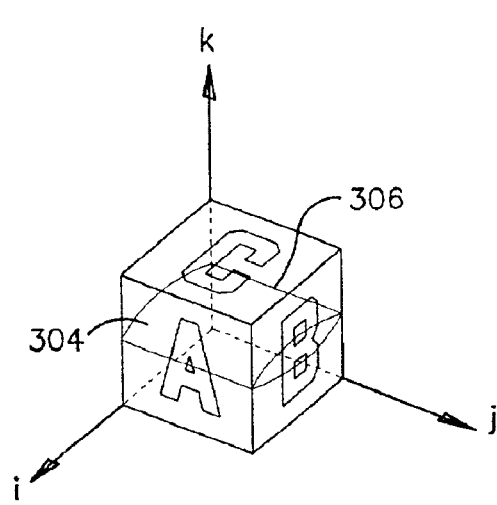
FIGS. 12–15 schematically illustrate another embodiment of first and second rotation axes and respective rotation angles about and through which the flight surface is rotatable in sequence to move the flight surface from a stowed position to a deployed position.

Referring now in detail to the drawings, and initially to FIG. 1, there is shown a flow chart 100 of a method for designing a deployment mechanism for a flight surface in accordance with the present invention. Initially, at step 110, a stowed position and a deployed position of the flight surface are identified. FIGS. 2 and 12, which are described in greater detail below, show exemplary stowed positions and FIGS. 7 and 15, which also are described in greater detail below, show exemplary deployed positions.

In step 120, a first rotation axis and a respective rotation angle are identified about and through which the flight surface may be rotated from the stowed position towards the desired deployed position. In step 130, a second, or successive, rotation axis and a respective rotation angle are identified about and through which the flight surface may be rotated to position the flight surface in the deployed position. In step 140, a single equivalent rotation axis and angle are determined based on the first and second rotation axes and rotation angles, about and through which the flight surface may be rotated to achieve the deployed position.

Several advantages are realized by the method according to the present invention. Because two axes and successive rotations are replaced by a single equivalent axis and rotation, the amount of parts and, consequently, the volume occupied by the deployment mechanism, is minimized. Moreover, by minimizing the number of parts, the structure of the deployment mechanism may be simplified. Also, the method simplifies the manner by which a single axis and single rotation angle may be obtained about and through which a flight surface is rotatable.

The following examples demonstrate the method according to the present invention and the advantages associated therewith.

EXAMPLE 1

FIGS. 2–7 schematically illustrate an embodiment of a flight surface 204 rotated in sequence from a stowed position to a deployed position. To facilitate describing the invention, the flight surface 204 is shown transposed in a cube with three of its sides marked with, respectively, the letters A, B and C. FIG. 2 shows the flight surface 204 in a stowed position. As is shown in FIG. 2, an orthogonal coordinate system (axes i, j and k) is assigned to the flight surface 204, the coordinate system representing the flight surface 204 in its stowed position. When the flight surface 204 is in its stowed position, the flight surface 204 lies in a plane parallel to the i and j axes, and a proximal end 206 of the flight surface 204 is parallel to the j axis and perpendicular to the plane defined by the i and k axes. The coordinate system serves as a reference datum from which a first rotation of the flight surface 204 is measured.

Figure 3:
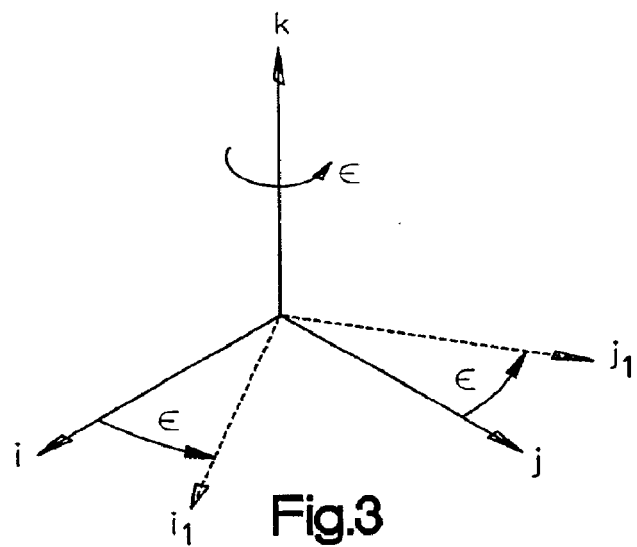
Figure 4:
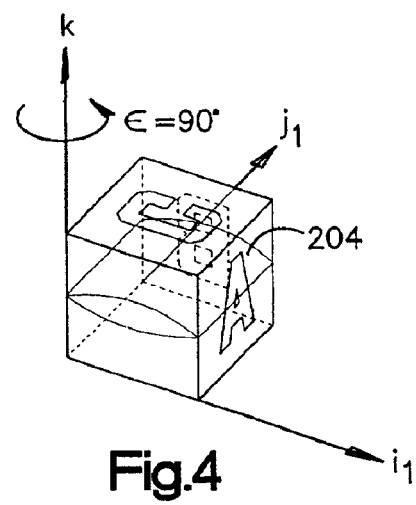
Figure 7:
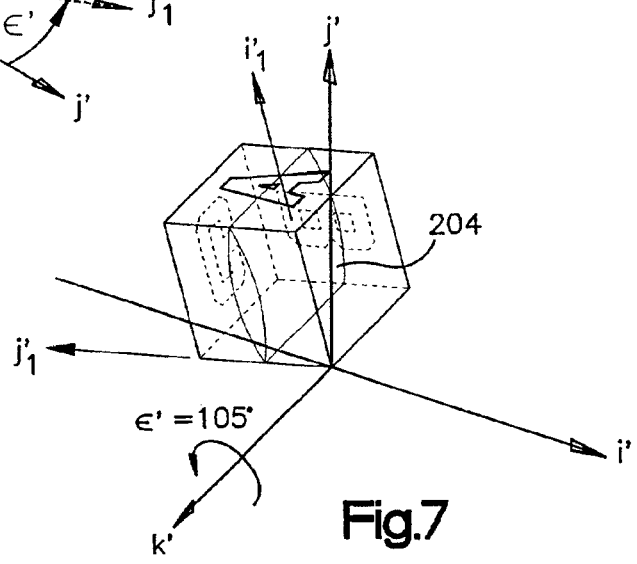

Referring to FIG. 3, k and $\epsilon$ represent the first rotation axis and the respective first rotation angle about and through which the flight surface 204 is rotated from the stowed position to a position intermediate the stowed position and the desired deployed position. In the illustrated embodiment, the first rotation angle $\epsilon$ is measured counterclockwise about the k axis. Once rotated, an orthogonal coordinate system (axes i1, j1 and k) is assigned to the flight surface 204, wherein i1 and j1 represent unit vectors obtained by rotating i and j, respectively, through the angle $\epsilon$. The i1, j1 and k coordinate system represents the flight surface 204 in the first, or intermediate, rotated position. The first rotation is one of two successive rotations in which the flight surface 204 is moved from its stowed position (FIG. 2) to its extended or deployed position (FIG. 7). FIG. 4 shows the flight surface 204 rotated through an exemplary first rotation angle $\epsilon$ of 90 degrees counterclockwise about the k axis.

Figure 5:
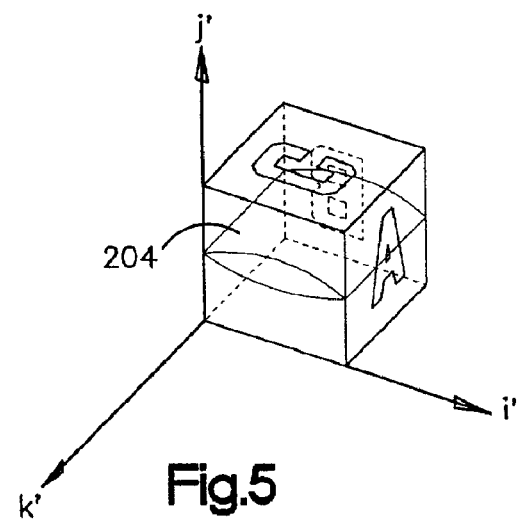

Referring now to FIG. 5, a second orthogonal coordinate system (axes i', j' and k') is assigned to the flight surface 204. The FIG. 5 coordinate system also represents the flight surface 204 in its intermediate position but serves as a reference datum from which a second rotation of the flight surface 204 is measured. As is described in greater detail below, assigning the i', j' and k' coordinate system to the intermediate position facilitates analyzing the relationship of the stowed and deployed positions relative to the intermediate position of the flight surface 204.

Figure 6:
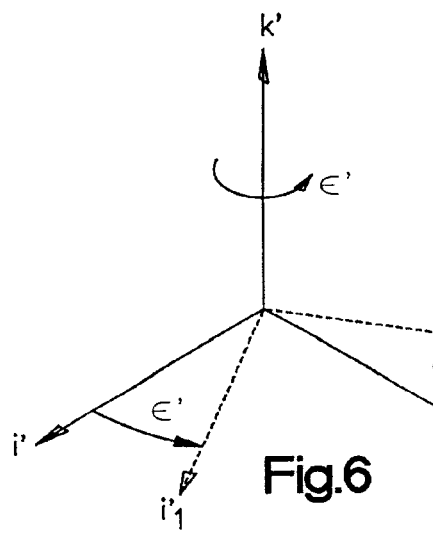

In a manner similar to the identification of the first rotation axis k and first rotation angle $\epsilon$, as shown in FIG. 6, a second rotation axis k' and a respective second rotation angle $\epsilon'$ about and through which the flight surface 204 is rotated from the intermediate position to the desired deployed position, are identified. In the illustrated embodiment, the second rotation angle $\epsilon'$ is measured counterclockwise about the k' axis. Once rotated, an orthogonal coordinate system (axes i'1, j'1 and k') (FIGS. 6 and 7) is assigned to the flight surface 204, wherein i'1 and j'1 represent unit vectors obtained by rotating i' and j', respectively, through the angle $\epsilon'$. The i'1, j'1 and k' coordinate system represents the flight surface 204 in a second rotated position (i.e., the deployed position). The second rotation is the second of the two successive rotations in which the flight surface 204 is moved from its stowed position (FIG. 2) to its extended or deployed position (FIG. 7). In FIG. 7, the flight surface 204 is shown rotated through an exemplary second rotation angle $\epsilon'$ of 105 degrees counterclockwise about the k' axis.

Figure 8:
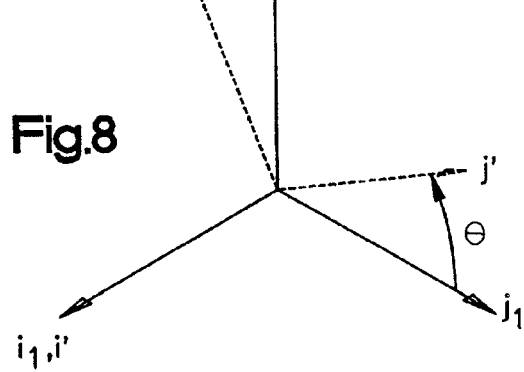
FIGS. 8 and 9 schematically illustrate the coordinate systems of the first and second rotation axes shown in FIGS. 2–7 transposed relative to one another.

Having identified the first and second rotation axes k and k' and respective rotation angles $\epsilon$ and $\epsilon'$ about and through which the flight surface 204 is successively rotated, a single equivalent rotation axis and rotation angle may then determined. One way to determine the single axis and rotation angle is by application of Euler's Theorem, which provides that a single axis and rotation angle may be derived from two axes and respective successive rotations. To facilitate use of Euler's Theorem in the present embodiment, the aforementioned i1, j1 and k intermediate coordinate system (FIG. 4) and the i', j' and k' intermediate coordinate system (FIG. 5) are transposed relative to one another according to the manner shown in FIG. 8. As is shown in FIG. 8, i1 coincides with i', and i1 and i' are perpendicular to k and k'. In this way, j1 and j' are in the plane of k and k'. The angle $\theta$ represents the angle between k and k'.

Figure 9:
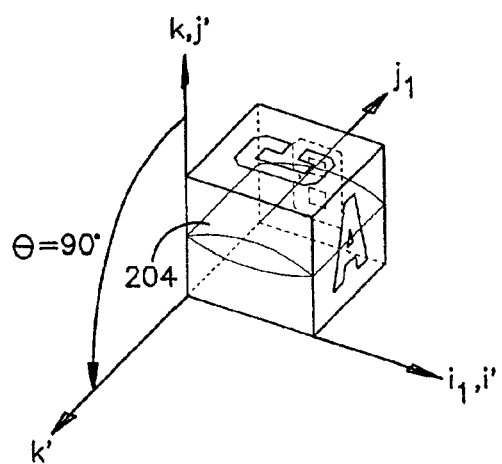

Referring to FIG. 9, assuming that the first and second rotations $\epsilon$ and $\epsilon'$ are about mutually perpendicular axes, then the angle $\theta$ between k and k' is 90 degrees (i.e., axes k and k', are perpendicular). Applying Euler's Theorem, a single equivalent angle ($\epsilon_r$) may be obtained from the equation:

$$\epsilon_r = 2\cos^{-1}\left[\cos\frac{\epsilon}{2}\cos\frac{\epsilon'}{2} - \sin\frac{\epsilon}{2}\sin\frac{\epsilon'}{2}\cos\theta\right]$$

and a single equivalent rotation axis ($k_r$) may be obtained from the equation:

$$k_r = k\frac{\sin\frac{\epsilon}{2}\cos\frac{\epsilon'}{2}}{\sin\frac{\epsilon_r}{2}} + k'\frac{\sin\frac{\epsilon'}{2}\cos\frac{\epsilon}{2}}{\sin\frac{\epsilon_r}{2}} + k'\times k\frac{\sin\frac{\epsilon}{2}\sin\frac{\epsilon'}{2}}{\sin\frac{\epsilon_r}{2}},$$

where $\epsilon$ is the first rotation angle, $\epsilon'$ is the second rotation angle, and $\theta$ is the angle between the first and second rotation axes k and k'.

Based on the foregoing, for a first rotation angle $\epsilon$ of 90 degrees, a second rotation angle $\epsilon'$ of 105 degrees, and an angle θ of 90 degrees between the first and second rotation axes k and k', the single equivalent rotation is:

$\epsilon_r = 129$ degrees and the single equivalent rotation axis is:

$k_r = 0.477k + 0.622k' + 0.622k' \times k$

However, from the relationships of the above coordinate systems, the following equations are applicable:

$j1 \sin\theta = k \cos\theta - k'$, $j' \sin\theta = k - k' \cos\theta$, and $i \sin\theta = k \times k'$ Thus, transposing the equivalent axis to the coordinate system i, j and k of the stowed position results in the following single equivalent axis:

$k_r = 0.622i - 0.622j + 0.477k$

Figure 10:
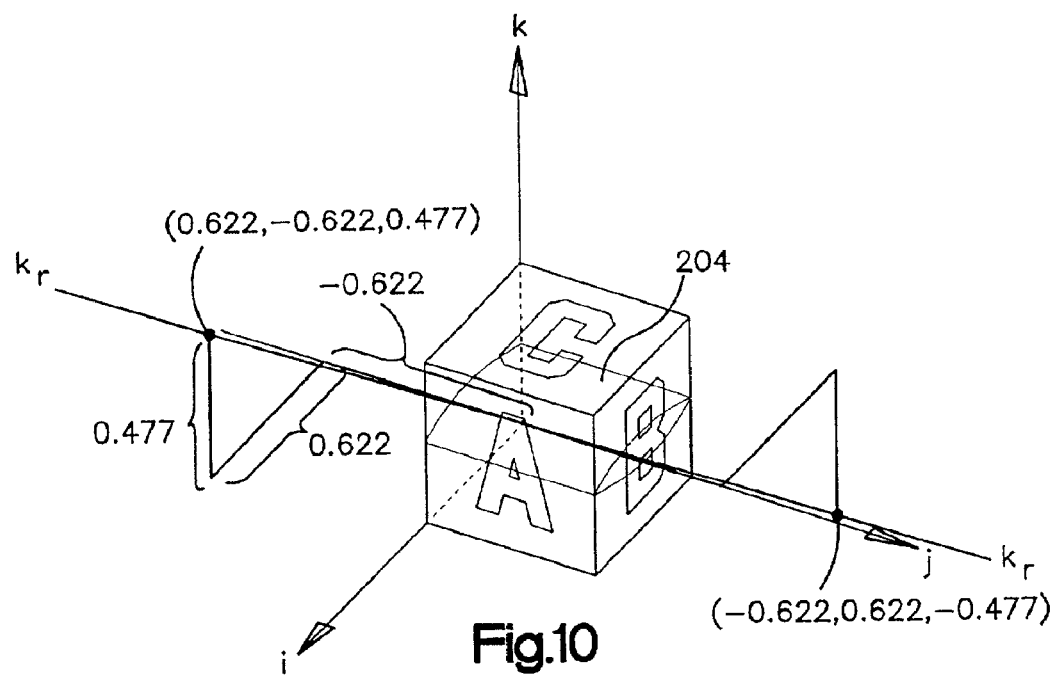
FIGS. 10 and 11 schematically illustrate a single equivalent rotation axis and single equivalent rotation angle based on the first and second rotation axes and respective rotation angles of FIGS. 2–7, about and through which the flight surface may be rotated from the stowed position to the deployed position, or vice versa, in accordance with the invention.
Figure 11:
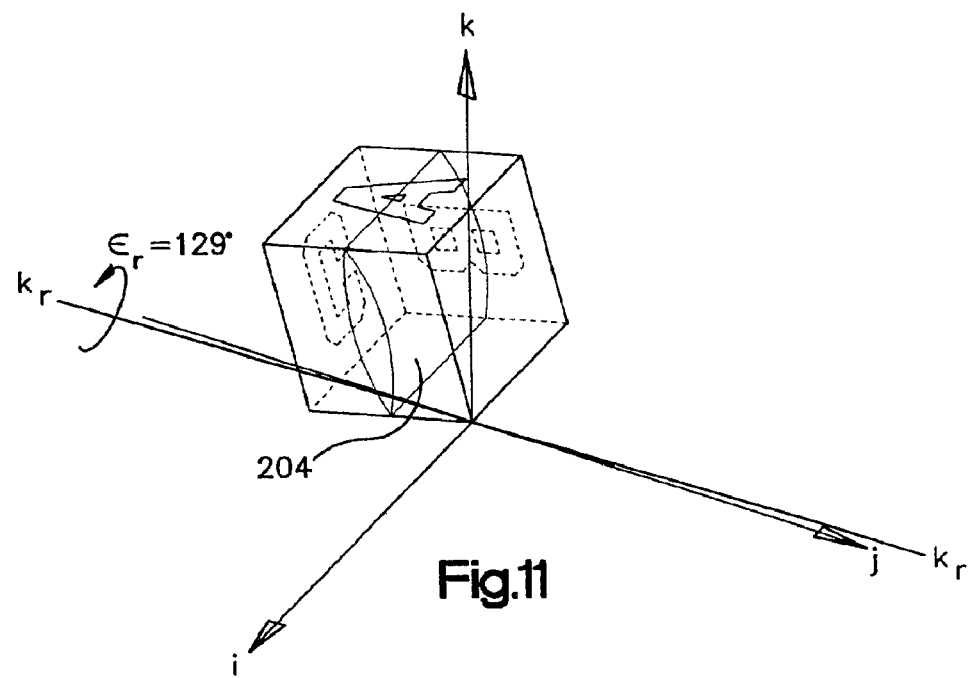

FIG. 10 shows the single equivalent axis $k_r$ transposed in the i, j and k coordinate system with the flight surface 204 in a stowed position. FIG. 11 shows the flight surface 204 rotated through the single equivalent rotation angle $\epsilon_r$ of 129 degrees counterclockwise about the single equivalent axis $k_r$. As can be seen by comparing FIGS. 7 and 11, the same result obtains if the flight surface 204 is successively rotated about and through first and second rotation axes and respective rotation angles (FIGS. 2–7), than if the flight surface 204 is rotated about and through a single equivalent rotation axis and rotation angle (FIGS. 10 and 11).

EXAMPLE 2

FIGS. 12–15 schematically illustrate another embodiment of a flight surface 304 rotated in sequence from a stowed position to a deployed position. To facilitate describing the invention, the flight surface 304 is shown transposed in a cube with three of its sides marked with, respectively, the letters A, B and C. FIG. 12 shows the flight surface 304 in a stowed position. As is shown in FIG. 12, an orthogonal coordinate system (axes i, j and k) is assigned to the flight surface 304, the coordinate system representing the flight surface 304 in its stowed position. When the flight surface 304 is in its stowed position, the flight surface 304 lies in a plane parallel to the i and j axes, and a proximal end 306 of the flight surface 304 is parallel to the j axis and perpendicular to the plane defined by the i and k axes. The coordinate system serves as a reference datum from which a first rotation of the flight surface 304 is measured.

Figure 13:
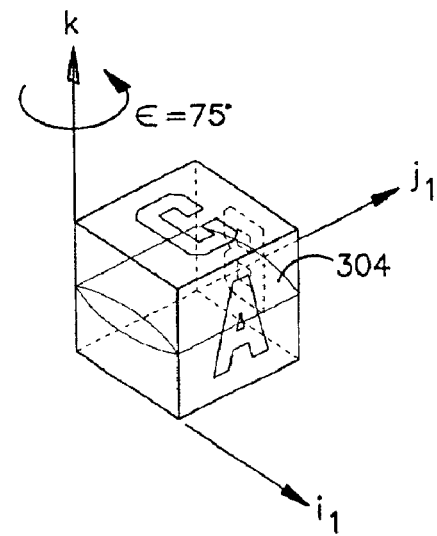

Referring to FIG. 13, k and ϵ represent the first rotation axis and the respective first rotation angle about and through which the flight surface 304 is rotated from the stowed position to a position intermediate the stowed position and the desired deployed position. Here, the flight surface 304 is rotated through an exemplary first rotation angle ϵ of 75 degrees counterclockwise about the k axis. An orthogonal coordinate system (axes i1, j1 and k) is assigned to the flight surface 304, and represents the flight surface 304 in the first, or intermediate, rotated position.

Figure 14:
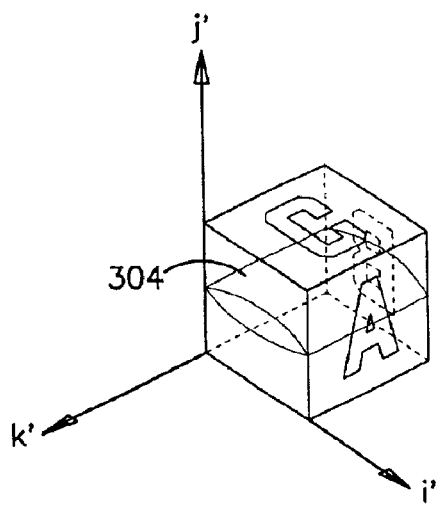
Figure 15:
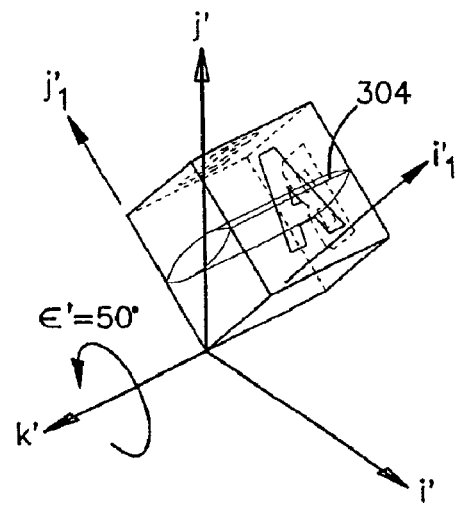

As shown in FIG. 14, a second orthogonal coordinate system (axes i', j' and k') is assigned to the flight surface 304 which represents the flight surface 304 in its intermediate position but serves as a reference datum from which a second rotation of the flight surface 304 is measured. Referring to FIG. 15, a second rotation axis k' and a respective second rotation angle ϵ' about and through which the flight surface 304 is rotated from the intermediate position to the desired deployed position, are identified. Here, the flight surface 304 is shown rotated through an exemplary second rotation angle ϵ' of 50 degrees counterclockwise about the k' axis. Once rotated, an orthogonal coordinate system (axes i'1, j'1 and k') (FIG. 15) is assigned to the flight surface 304, wherein i'1 and j'1 represent unit vectors obtained by rotating i' and j', respectively, through the angle ϵ'. The i'1, j'1 and k' coordinate system represents the flight surface 304 in a second rotated position (i.e., the deployed position).

Figure 16:
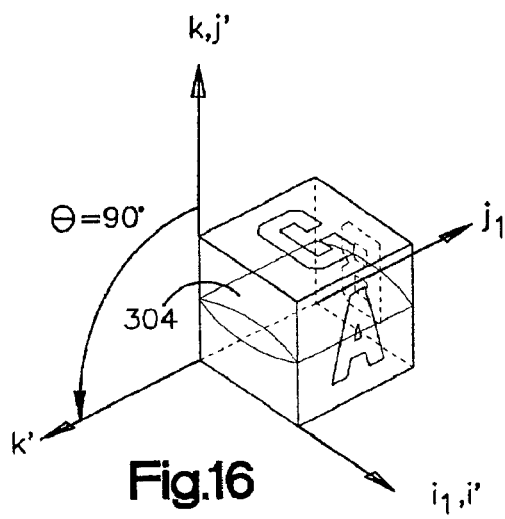
FIG. 16 schematically illustrates the coordinate systems of the first and second rotation axes shown in FIGS. 12–15 transposed relative to one another.

Having identified the first and second rotation axes k and k' and respective rotation angles ϵ and ϵ' about and through which the flight surface 304 is successively rotated, a single equivalent rotation axis and rotation angle may then determined. To facilitate use of Euler's Theorem, the i1, j1 and k coordinate system (FIG. 13) and the i', j' and k' coordinate system (FIG. 14) are transposed relative to one another according to the manner shown in FIG. 16. As is shown in FIG. 16, i1 coincides with i', and i1 and i' are perpendicular to k and k'. In this way, j1 and j' are in the plane of k and k'. The angle θ represents the angle between k and k'.

Referring to FIG. 16, assuming that the first and second rotations ϵ and ϵ' are about mutually perpendicular axes, then the angle θ between k and k' is 90 degrees (i.e., axes k and k', are perpendicular). Applying Euler's Theorem, for a first rotation angle ϵ of 75 degrees, a second rotation angle ϵ' of 50 degrees, and an angle θ of 90 degrees between the first and second rotation axes k and k', the single equivalent rotation is:

$\epsilon_r = 88$ degrees and the single equivalent rotation axis is:

$k_r = 0.794k + 0.482k' + 0.370k' \times k$

From the relationships of the above coordinate systems, transposing the equivalent axis to the coordinate system i, j and k of the stowed position results in the following single equivalent axis:

$k_r = 0.482i - 0.370j + 0.794k$

Figure 17:
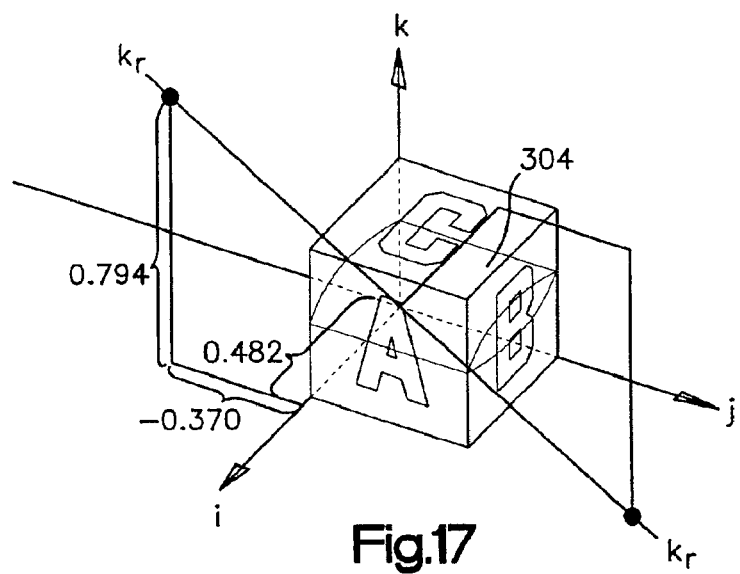
FIGS. 17 and 18 schematically illustrate a single equivalent rotation axis and single equivalent rotation angle based on the first and second rotation axes and respective rotation angles of FIGS. 12–15, about and through which the flight surface may be rotated from the stowed position to the deployed position, or vice versa, in accordance with the invention.
Figure 18:
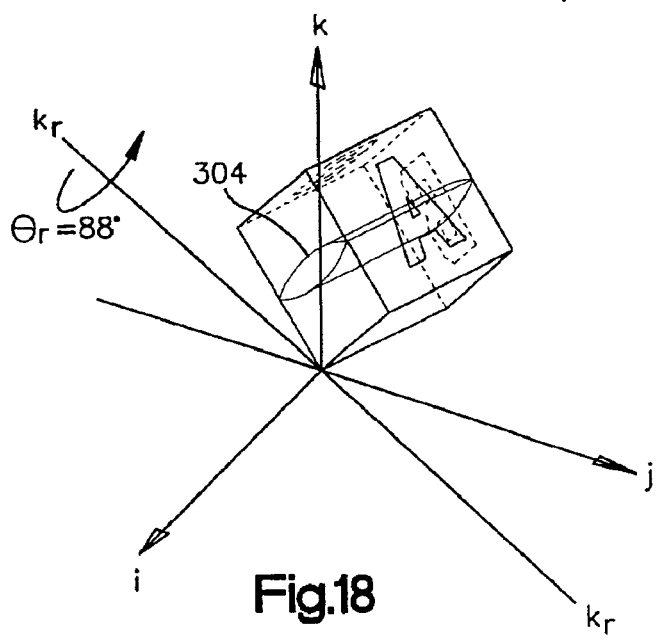

FIG. 17 shows the single equivalent axis $k_r$ transposed in the i, j and k coordinate system with the flight surface 304 in a stowed position. FIG. 18 shows the flight surface 304 rotated through the single equivalent rotation angle $\epsilon_r$ of 88 degrees counterclockwise about the single equivalent axis $k_r$. As can be seen by comparing FIGS. 15 and 18, the same result obtains if the flight surface 304 is successively rotated about and through first and second rotation axes and respective rotation angles (FIGS. 12–15), than if the flight surface 304 is rotated about and through a single equivalent rotation axis and rotation angle (FIGS. 17 and 18).

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method for designing a deployment mechanism for a flight surface on an airborne body, comprising the steps of:

determining a stowed position of the flight surface;

determining a deployed position of the flight surface;

identifying a first rotation axis and respective rotation angle and a second rotation axis and respective rotation angle about and through which the flight surface is rotatable in sequence to move the flight surface from the stowed position to the deployed position, or vice versa; and using the identified first and second rotation axes and rotation angles to determine a single equivalent rotation axis and angle, about and through which the flight surface can be rotated from the stowed position to the deployed position, or vice versa.

2. A method according to claim 1, wherein the using step determines the single equivalent rotation axis and angle in accordance with Euler's Rotation Theorem.

3. A method according to claim 1, wherein the equivalent angle ($\epsilon_r$) is obtained from the equation:

$$\varepsilon_r = 2\cos^{-1}\left[\cos\frac{\varepsilon}{2}\cos\frac{\varepsilon'}{2} - \sin\frac{\varepsilon}{2}\sin\frac{\varepsilon'}{2}\cos\theta\right]$$

and the equivalent rotation axis ($k_r$) is obtained from the equation:

$$k_r = k\frac{\sin\frac{\varepsilon}{2}\cos\frac{\varepsilon'}{2}}{\sin\frac{\varepsilon_r}{2}} + k'\frac{\sin\frac{\varepsilon'}{2}\cos\frac{\varepsilon}{2}}{\sin\frac{\varepsilon_r}{2}} + k' \times k\frac{\sin\frac{\varepsilon}{2}\sin\frac{\varepsilon'}{2}}{\sin\frac{\varepsilon_r}{2}},$$

where $\epsilon$ is the first rotation angle, and $\epsilon'$ is the second rotation angle, and $\theta$ is the angle between the rotation axes k and k'.

* * * * *